C. F. SCHWAB.
NUT LOCK.
APPLICATION FILED APR. 2, 1914.

1,138,898.

Patented May 11, 1915.

Witnesses
J. L. McCathran.
H. G. Vrooman.

Inventor
Charles F. Schwab
By E. E. Vrooman
his Attorney

UNITED STATES PATENT OFFICE.

CHARLES F. SCHWAB, OF EUGENE, OREGON.

NUT-LOCK.

1,138,898.  Specification of Letters Patent.  Patented May 11, 1915.

Application filed April 2, 1914. Serial No. 829,118.

*To all whom it may concern:*

Be it known that I, CHARLES F. SCHWAB, a citizen of the United States, residing at Eugene, in the county of Lane and State of Oregon, have invented certain new and useful Improvements in Nut-Locks, of which the following is a specification, reference being had therein to the accompanying drawing.

This invention relates to nut locks and has for its principal object the production of a simple and efficient means for positively locking a nut at a desired position upon the bolt.

Another object of this invention is the production of a simple and efficient locking frame which is so formed as to be easily positioned upon and carried by the nut in such a manner as to engage the bolt for positively retaining the nut in a set position upon the bolt.

With these and other objects in view, this invention consists of certain novel combinations, constructions and arrangements of parts as will be hereinafter fully described and claimed.

Figure 1:
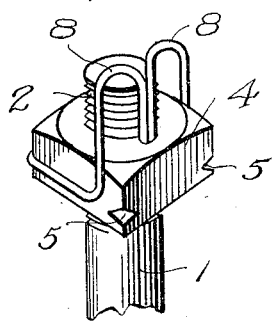
Figure 2:
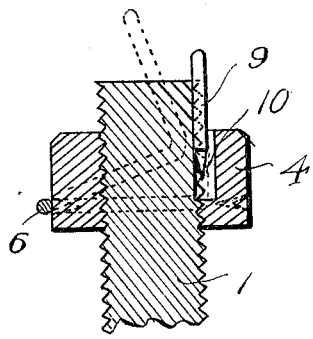
Figure 3:
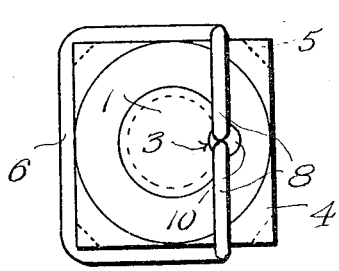
Figure 4:
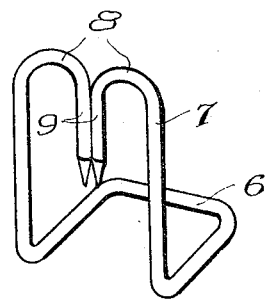

In the accompanying drawing:—Figure 1 is a detailed perspective view of the nut lock, the bolt being broken away. Fig. 2 is a fragmentary sectional view through the device. Fig. 3 is a front elevation of the nut lock in use. Fig. 4 is a detailed perspective view of the wire locking frame.

Referring to the accompanying drawing by numerals, 1 indicates the bolt which has its outer end threaded as indicated at 2. A longitudinal groove 3 is formed upon the bolt 1 so as to extend longitudinally upon the threaded portion thereof. The nut 4 is adapted to be carried by the threaded portion 2 and has a notch 5 formed at each corner thereof in alinement with each other. A nut is adapted to be locked in a set position upon the threaded portion of the bolt 1 and for accomplishing this function there is provided a simple and efficient resilient wire locking frame. This frame is very clearly disclosed in Fig. 4 and comprises a U-shaped body or portion 6. An arm 7 extends from each side of the body 6. Each arm 7 extends outwardly at right angles to the body 6 and is bent as shown at 8 to terminate in the parallel fingers 9. These fingers extend inwardly between the arms 7 in the direction of the body 6. The nut 4 is also provided with an internal pocket 10 which extends inwardly from the forward or outer face of the nut.

In operation the nut is first threaded upon the bolt to a desired position. The locking frame is then positioned upon the nut 4 to allow the body 6 to extend partially around the nut and be positioned within a plurality of the notches 5. Owing to the resilient construction of this locking frame the arms 7 and fingers 9 will be sprung as indicated in dotted lines in Fig. 2. The nut may then be turned or may have been turned so as to allow the pocket 10 to register with the longitudinal groove 3 as clearly shown in Fig. 3 so as to form an opening or bore into which the fingers 9 of the locking frame may be passed. As soon as the U-shaped body or portion 6 of the locking frame has been positioned upon the nut the fingers 9 may be directed into the opening caused by the registering of the pocket and groove and since the fingers will engage the side portions of the groove as clearly shown in Figs. 2 and 3, the nut will be held in a locked position upon the bolt. Therefore, any danger of the accidental displacement of the nut and bolt is eliminated. It will of course be seen that owing to the resilient construction of the wire locking frame it will positively bind upon the nut and bolt and thereby prevent its own accidental displacement. When however it is desired to rotate the nut, the frame may be easily sprung from its gripping engagement with the nut and bolt so as to release the nut and allow the same to be easily rotated.

From the foregoing description it will be seen that a very simple and efficient locking frame has been produced which is so formed as to be carried by a nut and engage the bolt for positively locking the nut in position.

Having thus described the invention what is claimed as new, is:—

1. A nut lock comprising a bolt having a longitudinal groove in the threaded end thereof, a nut threaded upon said bolt and having a pocket formed therein, said nut having notches at the corners thereof, and a wire locking frame engaging the outer portions of said nut and positioned within a plurality of said notches and having fingers positioned in an opening formed by the registering of said pocket and groove whereby said nut will be held in a locked position upon said bolt.

2. A nut lock comprising a bolt having a longitudinal groove formed in the threaded end thereof, a nut threaded upon said bolt, said nut provided with an internal pocket, said nut having notches formed at the corners thereof, and a wire locking frame carried by said nut and fitting within a plurality of said notches, said frame comprising a substantially U-shaped nut-engaging portion, outwardly extending arms formed upon said U-shaped portion, said arms terminating in inwardly extending parallel locking fingers adapted to be positioned in the opening formed by the registering of said pocket and said groove thereby locking said nut upon said bolt.

In testimony whereof I hereunto affix my signature in presence of two witnesses.

CHARLES F. SCHWAB.

Witnesses:
 JOHN BROOKMOYER,
 JOS. F. FRANZROD.

Copies of this patent may be obtained for five cents each, by addressing the "Commissioner of Patents, Washington, D. C."